(12) United States Patent
Tseng

(10) Patent No.: US 9,057,855 B2
(45) Date of Patent: Jun. 16, 2015

(54) BIDIRECTIONAL AND DOUBLE-FREQUENCY OPTICAL TRANSMISSION MODULE AND TRANSMISSION ASSEMBLY

(71) Applicant: Kuo-Fong Tseng, New Taipei (TW)

(72) Inventor: Kuo-Fong Tseng, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 127 days.

(21) Appl. No.: 13/676,360

(22) Filed: Nov. 14, 2012

(65) Prior Publication Data

US 2013/0315608 A1 Nov. 28, 2013

(30) Foreign Application Priority Data

May 22, 2012 (TW) .................................. 101118108

(51) Int. Cl.
*H04B 10/25* (2013.01)
*G02B 6/43* (2006.01)
*G02B 6/42* (2006.01)

(52) U.S. Cl.
CPC .............. *G02B 6/43* (2013.01); *H04B 10/2504* (2013.01); *G02B 6/4208* (2013.01); *G02B 6/4246* (2013.01)

(58) Field of Classification Search
CPC ............... H04B 10/40; H04B 10/2503; H04B 10/2504; G02B 6/43; G02B 6/4346; G02B 6/4308

USPC ...................... 398/41–42, 115–117, 135–139
See application file for complete search history.

(56) References Cited

U.S. PATENT DOCUMENTS

| | | | | |
|---|---|---|---|---|
| 4,910,727 A | * | 3/1990 | Fussganger | 398/139 |
| 4,957,339 A | * | 9/1990 | Fussganger et al. | 398/82 |
| 5,062,150 A | * | 10/1991 | Swanson et al. | 398/129 |
| 5,510,931 A | * | 4/1996 | Suyama | 359/341.3 |
| 5,995,259 A | * | 11/1999 | Meli et al. | 398/92 |
| 2005/0123241 A1 | * | 6/2005 | Margalit et al. | 385/39 |
| 2008/0240725 A1 | * | 10/2008 | Yokoyama | 398/139 |

* cited by examiner

*Primary Examiner* — Leslie Pascal
(74) *Attorney, Agent, or Firm* — Novak Druce Connolly Bove + Quigg LLP

(57) ABSTRACT

An optical transmission assembly includes a base plate, an optical signal emitting member, an efferent optical fiber, an optical coupler, an afferent optical fiber, and an optical signal receiving member. The optical signal emitting member is mounted on or besides the base plate. The optical signal isolator is mounted on the base plate, and alignes with the optical signal emitting member. The efferent optical fiber is mounted on the base plate. The optical coupler is located besides the base plate, coupling with the optical signal isolator via the efferent optical fiber. The afferent optical fiber is mounted on the base plate. The optical signal receiving member is mounted on or besides the base plate, coupling with the optical coupler via the afferent optical fiber. The present disclosure further includes a bidirectional and double-frequency optical transmission module having the optical transmission assembly.

17 Claims, 1 Drawing Sheet

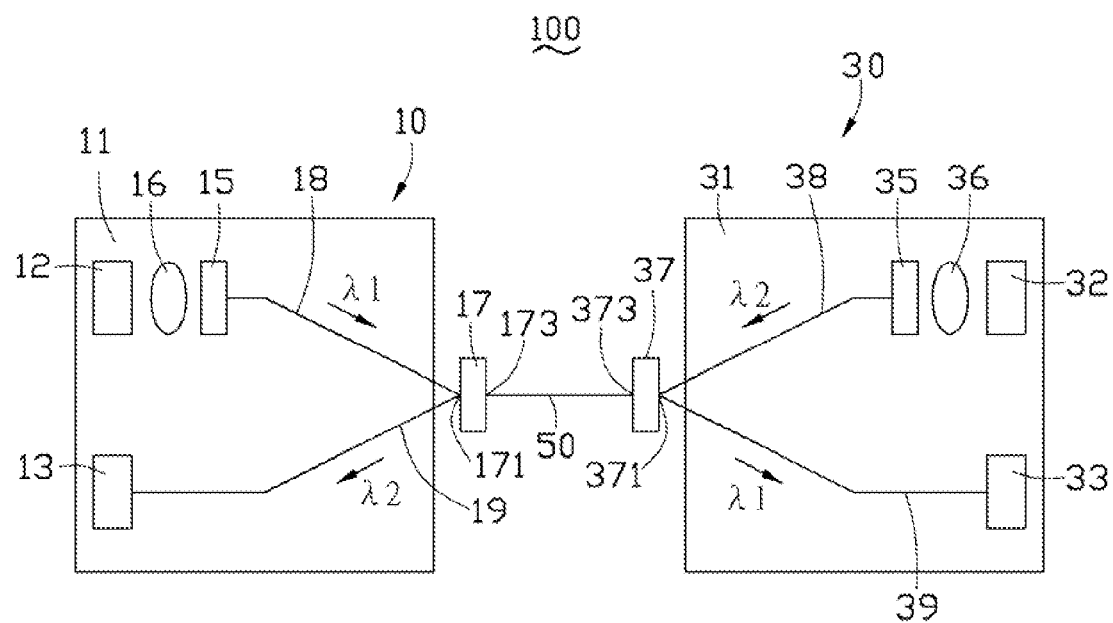

BIDIRECTIONAL AND DOUBLE-FREQUENCY OPTICAL TRANSMISSION MODULE AND TRANSMISSION ASSEMBLY

BACKGROUND

1. Technical Field

The present disclosure relates to optical transmission assemblies, particularly to a bidirectional and double-frequency optical transmission module, and an optical transmission assembly.

2. Description of Related Art

Optical communications or data communications may use a bidirectional optical transmission module, which uses double fibers for optical signal transmission. One optical fiber is configured to transmit optical signals along one particular direction, and an another optical fiber is configured to transmit optical signals along an opposite direction. However, it is costly to having to use two optical fibers for transmitting optical signals. In addition, during the transmission of optical signals, wavelength division multiplexing (WDM) and a filter may be used for reflecting optical signals to the optical fibers. However, it may increase the cost of the optical transmission assembly by using the filter, and may cause an optical loss.

Therefore, there is room for improvement in the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

The FIGURE is a schematic view of an embodiment of a bidirectional and double-frequency optical transmission system.

DETAILED DESCRIPTION

FIG. 1 shows an embodiment of a bidirectional and double-frequency optical transmission system 100. The optical transmission system 100 includes a first optical transmission assembly 10, a second optical transmission assembly 30, and a bi-directional transmitting optical fiber 50. The bi-directional transmitting optical fiber 50 interconnects the first optical transmission assembly 10 and the second optical transmission assembly 30, and transmits optical signals between the first optical transmission assembly 10 and the second optical transmission assembly 30.

The first optical transmission assembly 10 includes a first base plate 11, a first optical signal emitting member 12, a first optical signal receiving member 13, a first optical signal isolator 15, a first lens 16, a first optical coupler 17, a first efferent optical fiber 18, and a first afferent optical fiber 19. The first optical signal emitting member 12 and the first optical signal receiving member 13 are mounted on the first base plate 11, and are arranged apart at an end of the first base plate 11. The first optical signal isolator 15 and the first lens 16 are mounted on the first base plate 11. The first optical signal emitting member 12, the first lens 16, and the first optical signal isolator 15 are aligned in a straight line, and the first lens 16 is located between the first optical signal emitting member 12 and the first optical signal isolator 15. The first optical coupler 17 is arranged besides the first base plate 11, and includes an optical signal dividing end 171 and an optical signal coupling end 173 at opposite ends of the first optical coupler 17. Two distal ends of the first efferent optical fiber 18 couple with the first optical signal isolator 15 and the optical signal dividing end 171 of the first optical coupler 17, respectively. Two distal ends of the first afferent optical fiber 19 couple with the first optical signal receiving member 13 and the optical signal dividing end 171 of the first optical coupler 17, respectively. In other embodiments, the first optical signal emitting member 12 and the first optical signal receiving member 13 may not be mounted on the first base plate 11, such as the first optical signal emitting member 12 and the first optical signal receiving member 13 are located besides the first base plate 11, and the first optical signal emitting member 12 may be ensured to be configured to emit optical signals to the first optical signal isolator 15, and the first optical signal receiving member 13 may be ensured to be coupled with the first afferent optical fiber 19.

The second optical transmission assembly 30 is similar to the first optical transmission assembly 10, and includes a second base plate 31, a second optical signal emitting member 32, a second optical signal receiving member 33, a second optical signal isolator 35, a second lens 36, a second optical coupler 37, a second efferent optical fiber 38, and a second afferent optical fiber 39. The second optical signal emitting member 32 and the second optical signal receiving member 33 are mounted on the second base plate 31, and are arranged apart at an end of the second base plate 31 away from the first base plate 11. The second optical signal isolator 35 and the second lens 36 are mounted on the second base plate 31 at a side of the second optical signal emitting member 32 adjacent to the first base plate 11. The second optical signal emitting member 32, the second lens 36, and the second optical signal isolator 35 are aligned in a straight line. The second lens 36 is located between the second optical signal emitting member 32 and the second optical signal isolator 35. The second optical coupler 37 is arranged beside the second base plate 31, and located between the first optical coupler 17 and the second base plate 31. The second optical coupler 37 includes an optical signal dividing end 371 and an optical signal coupling end 373 at opposite ends thereof. Two distal ends of the second efferent optical fiber 38 are coupled with the second optical signal isolator 35 and the optical signal dividing end 371 of the second optical coupler 37, respectively. Two distal ends of the second afferent optical fiber 39 are coupled with the second optical signal receiving member 33 and the optical signal dividing end 371 of the second optical coupler 37, respectively. In other embodiments, the second optical signal emitting member 32 and the second optical signal receiving member 33 may not have been mounted on the second base plate 31, such as, for example, are located besides the second base plate 31, and the second optical signal emitting member 32 may be configured to be ensured to emit optical signals to the second optical signal isolator 35, and the second optical signal receiving member 33 may be ensured to couple with the second afferent optical fiber 39.

The first base plate 11 and the second base plate 31 may be made of semi conductive materials, high polymer materials, or metallic materials. In the illustrated embodiment, the first base plate 11 and the second base plate 31 are planar optical waveguides made of semi conductive materials, for decreasing an optical loss of the first optical transmission assembly 10 and the second optical transmission assembly 30. The first optical signal emitting member 12 and the second optical signal emitting member 32 may be edge-emitting laser diodes or surface-emitting laser diodes. The first optical signal receiving member 13 and the second optical signal receiving member 33 may be photodiodes. The first efferent optical fiber 18, the first afferent optical fiber 19, the second efferent optical fiber 38, and the second afferent optical fiber 39 may be single-mode optical fibers or multimode optical fibers.

In the illustrated embodiment, the bi-directional transmitting optical fiber 50 is a signal-mode optical fiber. Two distal ends of the bi-directional transmitting optical fiber 50 are coupled with the optical signal coupling end 173 of the first optical coupler 17 and the optical signal coupling end 373 of the second optical coupler 37, respectively, for transmitting optical signals between the optical signal coupling end 173 of the first optical coupler 17 and the optical signal coupling end 373 of the second optical coupler 37. In other embodiments, the double-direction transmitting optical fiber 50 may be multimode optical fiber.

In use, the first optical transmission assembly 10 and the second optical transmission assembly 30 are respectively set or configured in two electronic devices (not shown). The two electronic devices both include driving circuits (not shown), for allowing the first optical transmission assembly 10 and the second optical transmission assembly 30 to achieve or perform their respective functions. The first optical signal emitting member 12 emits optical signals of a wavelength defined as $\lambda_1$. The optical signals are transmitted to the first optical signal isolator 15 via collecting by the first lens 16, and then are transmitted to the first optical coupler 17 via the first efferent optical fiber 18. The bi-directional transmitting optical fiber 50 transmits the optical signals of wavelength $\lambda_1$ to the second optical coupler 37, and then the optical signals of wavelength $\lambda_1$ are further transmitted to the second afferent optical fiber 39. The second optical signal receiving member 33 receives the optical signals of wavelength $\lambda_1$.

The second optical signal emitting member 32 emits optical signals of a wavelength defined as $\lambda_2$. The optical signals are transmitted to the second optical signal isolator 35 via collecting by the second lens 36, and then are transmitted to the second optical coupler 37 via the second efferent optical fiber 38. The bi-directional transmitting optical fiber 50 transmits the optical signals of wavelength $\lambda_2$ to the first optical coupler 17, and then the optical signals of wavelength $\lambda_2$ are further transmitted to the first afferent optical fiber 19. The first optical signal receiving member 13 receives the optical signals of wavelength $\lambda_2$. Thus the bi-directional transmitting optical fiber 50 achieves a bi-directional transmission of optical signals.

Because the optical signals being transmitted according to the embodiment of instant disclosure do not need to be reflected during transmission, thus an optical loss caused by reflection is thereby prevented. The optical transmission system 100 has a simpler structure, and decreasing the cost.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A bidirectional and double-frequency optical transmission system, comprising:
    a first optical transmission assembly, comprising:
        a first base plate;
        a first optical signal emitting member mounted on the first base plate;
        a first optical signal isolator mounted on the first base plate, and aligned in a straight line with the first optical signal emitting member;
        a first efferent optical fiber mounted on the first base plate, one end of the first efferent optical fiber directly connected to the first optical signal isolator;
        a first optical coupler located beside the first base plate and directly connected to another end of the first efferent optical fiber;
        a first afferent optical fiber mounted on the first base plate; and
        a first optical signal receiving member mounted on the first base plate, one end of the first afferent optical fiber directly connected to the first optical signal receiving member and another end of the first afferent optical fiber directly connected to the first optical coupler,
    a second transmission assembly, comprising:
        a second base plate;
        a second optical signal emitting member mounted on the second base plate;
        a second optical signal isolator mounted on the second base plate, and aligned in a straight line with the second optical signal emitting member;
        a second efferent optical fiber mounted on the second base plate, one end of the second efferent optical fiber directly connected to the second optical signal isolator;
        a second optical coupler located beside the second base plate and directly connected to another end of the second efferent optical fiber; and
        a second afferent optical fiber mounted on the second base plate, and
        a second optical signal receiving member mounted on the second base plate, one end of the second afferent optical fiber directly connected to the second optical signal receiving member and another end of the second afferent optical fiber directly connected to the second optical coupler; and
    a bi-directional transmitting optical fiber coupling the first optical coupler and the second optical coupler,
    wherein the first optical signal emitting member and the second optical signal emitting member respectively emit optical signals of different frequencies, the optical signals emitted by the first optical signal emitting member are transmitted to the second optical signal receiving member via the first optical signal isolator, the first efferent optical fiber, the first optical coupler, the bi-directional transmitting optical fiber, the second optical coupler, and the second afferent optical fiber, the optical signals emitted by the second optical signal emitting member are transmitted to the first optical signal receiving member via the second optical signal isolator, the second efferent optical fiber, the second optical coupler, the bi-directional transmitting optical fiber, the first optical coupler, and the first afferent optical fiber.

2. The bidirectional and double-frequency optical transmission system of claim 1, wherein the first optical transmission assembly further comprises a first lens, the first lens is mounted on the first base plate, and located between the first optical signal emitting member and the first optical signal isolator, the first lens collects the optical signals emitted by the first optical signal emitting member to the first optical signal isolator.

3. The bidirectional and double-frequency optical transmission system of claim 1, wherein the second optical transmission assembly further comprises a second lens, the second lens is mounted on the second base plate, and located between the second optical signal emitting member and the second optical signal isolator, the second lens collects the optical signals emitted by the second optical signal emitting member to the second optical signal isolator.

4. The bidirectional and double-frequency optical transmission system of claim 1, wherein the first base plate and the second base plate are planar optical waveguides.

5. The bidirectional and double-frequency optical transmission system of claim 1, wherein the first optical signal emitting member and the second optical signal emitting member are laser diodes.

6. The bidirectional and double-frequency optical transmission system of claim 1, wherein the first optical signal receiving member and the second optical signal receiving member are photodiodes.

7. The bidirectional and double-frequency optical transmission system of claim 1, wherein the bi-directional transmitting optical fiber is a signal-mode optical fiber.

8. The bidirectional and double-frequency optical transmission system of claim 1, wherein the first efferent optical fiber, the first afferent optical fiber, the second efferent optical fiber, and the second afferent optical fiber are multimode optical fibers.

9. The bidirectional and double-frequency optical transmission system of claim 1, wherein the first optical coupler comprises an optical signal dividing end and an optical signal coupling end, the optical signal dividing end couples with the first optical signal isolator via the first efferent optical fiber, the optical signal coupling end couples with the bi-directional transmitting optical fiber.

10. The bidirectional and double-frequency optical transmission system of claim 1, wherein the second optical coupler comprises an optical signal dividing end and an optical signal coupling end, the optical signal dividing end couples with the second optical signal isolator via the second efferent optical fiber, the optical signal coupling end couples with the bi-directional transmitting optical fiber.

11. An optical transmission assembly, comprising:
a base plate;
an optical signal emitting member mounted on the base plate;
an optical signal isolator mounted on the base plate, and aligned with the optical signal emitting member;
an efferent optical fiber mounted on the base plate, one end of the efferent optical fiber directly connected to the optical signal isolator;
an optical coupler located beside the base plate and directly connected to another end of the efferent optical fiber;
an afferent optical fiber mounted on the base plate; and
an optical signal receiving member mounted on the base plate, one end of the afferent optical fiber directly connected to the optical signal receiving member and another end of the afferent optical fiber directly connected to the optical coupler.

12. The optical transmission assembly of claim 11, wherein the optical transmission assembly further comprises a lens, the lens is mounted on the base plate, and located between the optical signal emitting member and the optical signal isolator, the lens collects the optical signals emitted by the optical signal emitting member to the optical signal isolator.

13. The optical transmission assembly of claim 11, wherein the base plate is a planar optical waveguide.

14. The optical transmission assembly of claim 11, wherein the optical signal emitting member is a laser diode.

15. The optical transmission assembly of claim 11, wherein the optical signal receiving member is a photodiode.

16. The optical transmission assembly of claim 11, wherein the efferent optical fiber and the afferent optical fiber are multimode optical fibers.

17. The optical transmission assembly of claim 11, wherein the optical coupler comprises an optical signal dividing end and an optical signal coupling end, the optical signal dividing end couples with the optical signal isolator via the efferent optical fiber.

\* \* \* \* \*